United States Patent
Muppalla (10) Patent No.: US 8,797,907 B2
(45) Date of Patent: *Aug. 5, 2014

(54) INCREASING THROUGHPUT BY ADAPTIVELY CHANGING PDU SIZE IN WIRELESS NETWORKS UNDER LOW SNR CONDITIONS

(71) Applicant: Juniper Networks, Inc., Sunnyvale, CA (US)

(72) Inventor: Dharmadeep C. Muppalla, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/732,195

(22) Filed: Dec. 31, 2012

(65) Prior Publication Data

US 2013/0121201 A1 May 16, 2013

Related U.S. Application Data (63) Continuation of application No. 12/779,229, filed on May 13, 2010, now Pat. No. 8,363,613.

(51) Int. Cl.
*G01R 31/08* (2006.01)
(52) U.S. Cl.
USPC .......................................................... 370/252
(58) Field of Classification Search
USPC ......... 370/203, 204–215, 216–228, 229–240, 370/241–253, 254–271, 310–337, 338–350, 370/395.3, 395.4, 395.41, 395.42, 395.5, 370/395.52, 431–457, 458–463, 464–497, 370/498–522, 523–520, 521–529
See application file for complete search history.

(56) References Cited

U.S. PATENT DOCUMENTS

| | | | |
|---|---|---|---|
| 6,690,647 | B1 | 2/2004 | Tang et al. |
| 7,965,738 | B2 | 6/2011 | So et al. |
| 2004/0151122 | A1 | 8/2004 | Lau et al. |
| 2005/0105506 | A1 | 5/2005 | Birdwell et al. |
| 2006/0018287 | A1 | 1/2006 | Walton et al. |
| 2006/0268880 | A1 | 11/2006 | Zhao et al. |
| 2007/0041349 | A1 | 2/2007 | Kim et al. |
| 2007/0195820 | A1 | 8/2007 | So et al. |
| 2007/0263706 | A1 | 11/2007 | Tzannes |
| 2009/0074088 | A1 | 3/2009 | Tao et al. |

OTHER PUBLICATIONS

Copending U.S. Appl. No. 12/779,229, filed May 13, 2010, entitled "Increasing Throughput by Adaptively Changing PDU Size in Wireless Networks Under Low SNR Conditions", by Dharmadeep C. Muppalla, 33 pages.

*Primary Examiner* — Jung-Jen Liu
(74) *Attorney, Agent, or Firm* — Harrity & Harrity, LLP

(57) ABSTRACT

Feedback indicates low signal-to-noise ratio (SNR) conditions for a wireless communications link between a transmitter device and a receiver device. After attempting to achieve a target packet error rate (PER) by increasing transmission power for the wireless communications link, the transmitter device receives feedback that indicates a current PER, for data transmitted using an initial automatic repeat request (ARQ) block size, is above the target PER for the receiver device, and changes, based on the feedback, the current ARQ block size to a different ARQ block size for the wireless communications link. The different ARQ block size may be adaptively selected to provide a maximum PDU size that achieves the target PER at the receiver device under the low SNR conditions.

20 Claims, 7 Drawing Sheets

INCREASING THROUGHPUT BY ADAPTIVELY CHANGING PDU SIZE IN WIRELESS NETWORKS UNDER LOW SNR CONDITIONS

RELATED APPLICATION

This application is a continuation of U.S. patent application Ser. No. 12/779,229, filed May 13, 2010, which is incorporated herein by reference.

BACKGROUND

An automatic repeat request (ARQ) is a mechanism by which a receiving end of a wireless connection can request retransmission of a media access control (MAC) protocol data unit (PDU), generally as a result of having received the PDU with errors. The ARQ mechanism is a part of the IEEE 802.16 MAC layer and can be enabled on a per-connection basis.

Under low signal-to-noise ratio (SNR) conditions in wireless networks, various techniques can be used to keep packet error rate (PER) under control. Some of these techniques include a transmitter using better modulation, coding, and repetition. For example when a low SNR is detected, a transmitter may use quadrature phase-shift keying (QPSK) modulation with a forward error correction (FEC) rate of one-half and repetition rate of two.

Another technique to control PER under low SNR conditions includes hybrid ARQ (HARQ) burst chase combining. For example, a receiver may use multiple retransmissions of the same burst to converge on a maximum likelihood decoding of FEC blocks. This technique is considered to be part of the physical layer. After FEC decoding, cyclic redundancy check (CRC) data can be checked to decide on the fate of the burst.

Still another technique to control PER under low SNR conditions includes using ARQ at the MAC layer to retransmit any packets in error. If HARQ is used, CRC on the HARQ burst would not be used in this case, since the ARQ blocks have CRC. In general, a burst, HARQ or not, will have multiple ARQ blocks.

Finally, to control PER under low SNR conditions, the transmitter can vary its power based on SNR feedback from the receiver. If the above techniques fail to provide an acceptable PER, a transmitter typically sends a resynchronization message to the receiver.

In spite of all the above techniques, there can still be low coverage areas in wireless networks where PER is unacceptably high.

SUMMARY

According to one aspect, a method, implemented by a transmitter device in a wireless network, may include receiving, by the transmitter device and from a receiver device, feedback that indicates a low signal-to-noise ratio (SNR) and a current packet error rate (PER) above a target PER for a wireless communications link between the transmitter device and the receiver device. The method may also include reducing, by the transmitter device, a current automatic repeat request (ARQ) block size to a second size below an initial size for the wireless communications link; and transmitting, from the transmitter device and to the receiver device, data over the wireless communications link using the second ARQ block size. The method may also include receiving, by the transmitter device and from the receiver device, feedback that indicates a current packet error rate (PER), for the data transmitted using the second ARQ block size, is below the target PER for the wireless communications link; and increasing, by the transmitter device, the current ARQ block size to a third size for the wireless communications link, where the third ARQ block size is between the initial ARQ block size and the second ARQ block size.

According to another aspect, a device may include a memory to store a plurality of instructions and a processor to execute instructions in the memory to receive, from a receiver device, feedback that indicates low SNR conditions for a wireless communications link between the transmitter device and the receiver device, and increase transmission power for the wireless communications link. After increasing the transmission power, the processor may also execute instructions in the memory to receive, from the receiver device, feedback that indicates a current PER, for data transmitted using an initial ARQ block size, is above a target PER for the receiver device; and change, based on the feedback that indicates the current PER, the current ARQ block size to a different ARQ block size for the wireless communications link, where the different ARQ block size is adaptively selected to provide a maximum PDU size that achieves the target PER at the receiver device under the low SNR conditions.

According to still another aspect, a computer-readable medium may include one or more instructions for receiving from a receiver device, feedback that indicates low SNR conditions for a wireless communications link between a transmitter device and the receiver device; one or more instructions for transmitting packets from the transmitter device to the receiver device using an initial ARQ block size; one or more instructions for receiving, from the receiver device, feedback indicating that a current PER is above a target PER for the receiver device; and one or more instructions for adaptively changing, based on the feedback that indicates the current PER, the ARQ block size to a smaller ARQ block size for the wireless communications link, where the smaller ARQ block size is determined using a binary convergence algorithm.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Implementations described herein may include systems and/or methods that allow for increased packet throughput by adaptively changing PDU size in wireless networks under low SNR conditions. After conventional techniques for controlling PER under low SNR conditions have been applied, systems and/or methods described herein may be implemented to achieve a target PER. For example, after a transmitter (e.g., a mobile terminal or a wireless station) has attempted to increase power levels to overcome low SNR conditions, systems and/or methods described herein may receive feedback indicating that a current PER is above a target PER for a receiver device, and may adaptively change the ARQ block size to a smaller ARQ block size for the wireless communications link. The smaller ARQ block size may be adaptively selected to provide a maximum PDU size that achieves the target PER at the receiver device. The smaller ARQ block size may be determined using a binary convergence algorithm and may be adaptively adjusted based on PER feedback.

The terms "component" and "device," as used herein, are intended to be broadly construed to include hardware (e.g., a processor, a microprocessor, an application-specific integrated circuit (ASIC), field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Network Environment

Figure 1:
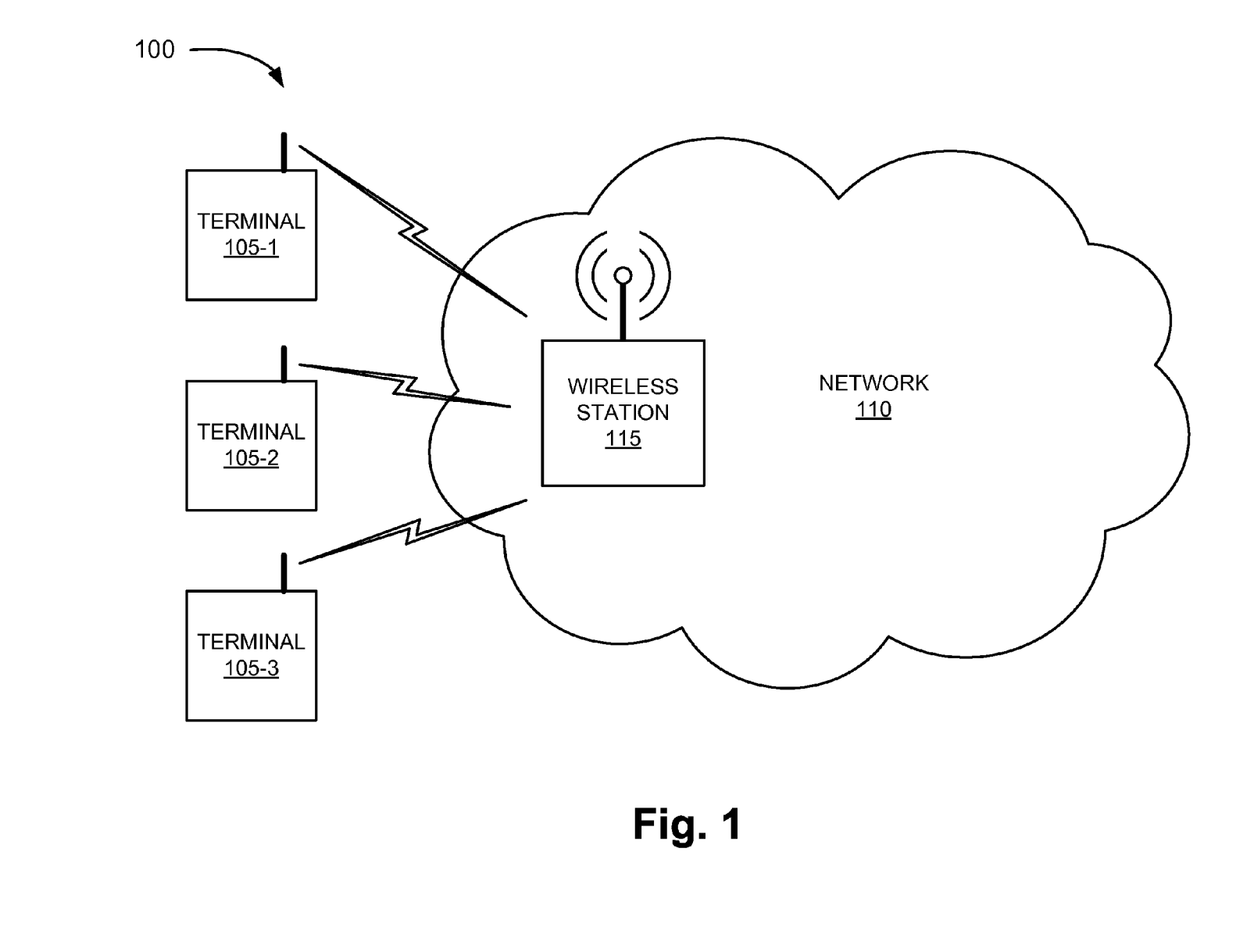
FIG. 1 is a diagram illustrating an example wireless environment.

FIG. 1 is a diagram of an example wireless environment 100 in which systems and/or methods described herein may be implemented. As illustrated, environment 100 may include, among other devices, terminals 105-1, 105-2, and 105-3 (collectively referred to as terminals 105 and singularly as terminal 105), network 110, and wireless station 115. In practice, the number of terminals 105 and/or the number of wireless stations 115 may be different.

Terminal 105 may include a mobile terminal by which a user may access services by maintaining a communication link with wireless station 115. Terminal 105 may include, for example, a mobile phone, a personal digital assistant (PDA), a mobile computer, a laptop, a gaming device, a music playing device, a video playing device, a web browsing device, and/or another type of handset or communication device. Terminal 105 may alternatively be referred to as subscriber stations, user equipment, or mobile stations.

Network 110 may include any type of network, such as a wide area network (WAN), a local area network (LAN), a public switched telephone network (PSTN), the Internet, a private network, or a combination of networks. Network 110 may provide services and/or resources to a user of terminal 105.

Wireless station 115 may include a device that handles wireless transmissions to and from terminal 105 to provide access to network 110. For example, wireless station 115 may include a base station, such as a base transceiver station (BTS) in a GSM system, an eNodeB in a Long Term Evolution (LTE) system, a Node B in a Universal Mobile Telecommunications System (UMTS), etc. Additionally, or alternatively, wireless station 115 may include a device for amplifying a signal, coding/decoding a signal and/or forwarding a signal (e.g., a repeater or a relay). Additionally, or alternatively, wireless station 115 may include a device for attaching and/or inserting an additional signal or information to a signal before forwarding, amplifying, and/or decoding it. In this regard, wireless station 115 is intended to be broadly interpreted to include any type of node that may perform one or more operations in accordance with a wireless environment. In one implementation, wireless station 115 may connect to terminal 105 using an orthogonal frequency division multiple access (OFDMA) network protocol.

Although FIG. 1 shows example devices of wireless environment 100, in other implementations, wireless environment 100 may contain fewer devices, different devices, differently arranged devices, or additional devices than depicted in FIG. 1. For example, wireless environment 100 may include base station controllers, radio network controllers, access gateway devices, etc.

Device Configurations

Figure 2:
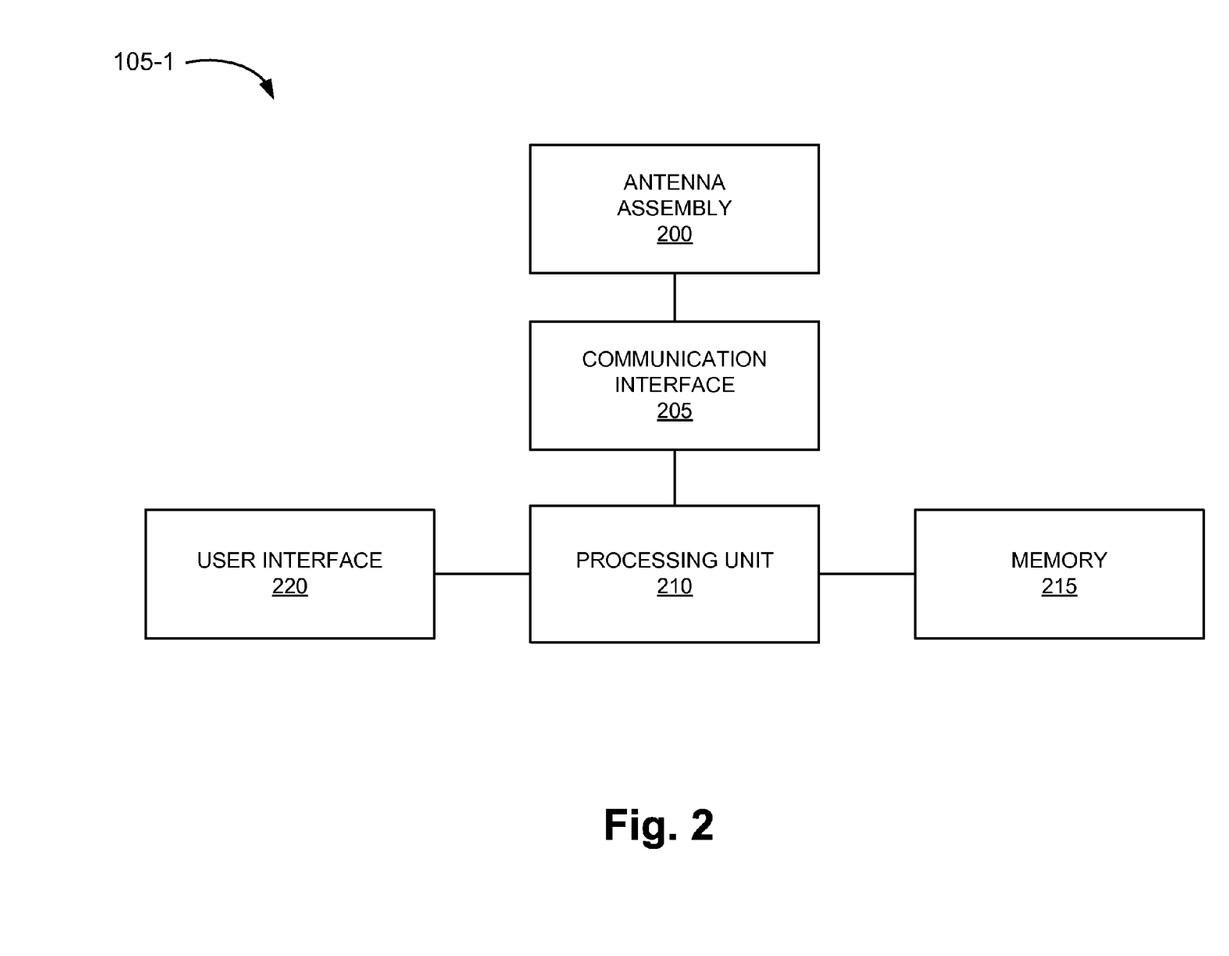
FIG. 2 is a diagram illustrating example components that may correspond to terminals depicted in FIG. 1.

FIG. 2 is a diagram illustrating example components that may be associated with terminal 105-1. Terminals 105-2 and 105-3 may be similarly configured. As illustrated, terminal 105-1 may include an antenna assembly 200, a communication interface 205, a processing unit 210, a memory 215, and a user interface 220.

Antenna assembly 200 may include one or more antennas to transmit and receive wireless signals over the air. Communication interface 205 may include, for example, a transmitter that may convert baseband signals from processing unit 210 to radio frequency (RF) signals and/or a receiver that may convert received RF signals to baseband signals for use by processing unit 210.

Processing unit 210 may control the operation of terminal 105-1. For example, processing unit 210 may include a general purpose processor, a microprocessor, a data processor, a co-processor, a network processor, an ASIC, a controller, a programmable logic device, a chipset, a FPGA, or any other component or group of components that may interpret and execute instructions.

Memory 215 may include any type of device that stores data and instructions related to the operation and use of terminal 105-1. For example, memory 215 may include a RAM, a dynamic RAM (DRAM), a static RAM (SRAM), a ROM, a programmable ROM (PROM), and/or a flash memory.

User interface 220 may include a device for inputting information to terminal 105-1 and/or for outputting information from terminal 105-1. Examples of input and output devices may include a speaker, a microphone, control buttons, a keypad, a display, and/or a vibrator to cause terminal 105-1 to vibrate.

As described herein, terminal 105-1 may perform certain operations in response to processing unit 210 executing software instructions contained in a computer-readable medium, such as memory 215. A computer-readable medium may be defined as a physical or logical memory device. A logical memory device may include memory space within a single physical memory device or spread across multiple physical memory devices. The software instructions may be read into memory 215 from another computer-readable medium or from another device via communication interface 205. The software instructions contained in memory 215 may cause processing unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of terminal 105-1, in other implementations, terminal 105-1 may contain fewer components, different components, differently arranged components, or additional components than depicted in FIG. 2. Alternatively, or additionally, one or more components of terminal 105-1 may perform one or more other tasks described as being performed by one or more other components of terminal 105-1.

Figure 3:
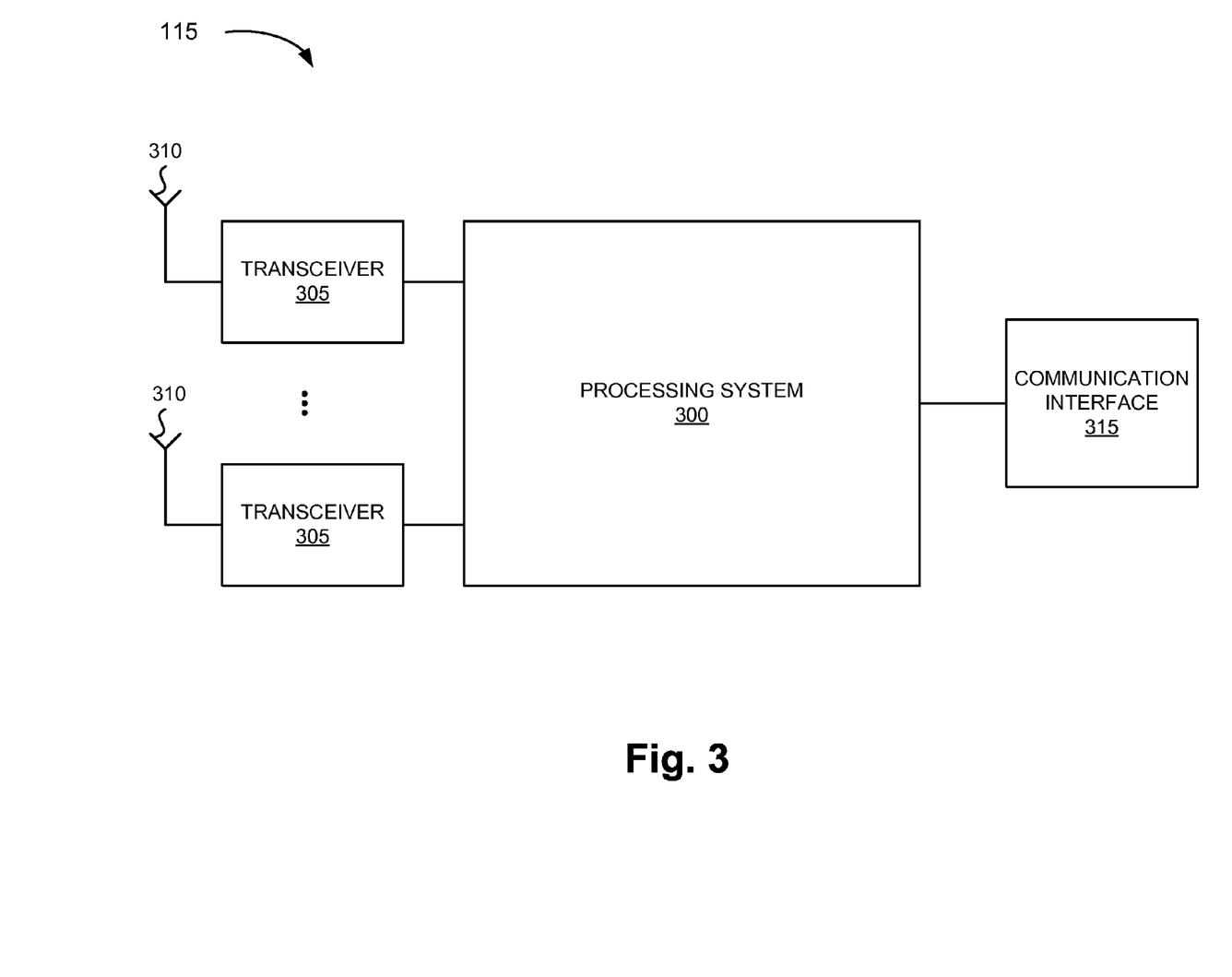
FIG. 3 is a diagram illustrating example components that may correspond to a wireless station depicted in FIG. 2.

FIG. 3 is a diagram illustrating example components that may be associated with wireless station 115. As illustrated, wireless station 115 may include a processing system 300, transceivers 305, antennas 310, and a communication interface 315.

Processing system 300 may control the operation of wireless station 115. For example, processing system 300 may include a general purpose processor, a microprocessor, a data processor, a co-processor, a network processor, an ASIC, a controller, a programmable logic device, a chipset, a FPGA, or any other component or group of components that may interpret and execute instructions. Processing system 300 may include a memory and/or other storage devices.

Transceivers 305 may be associated with antennas 305 and may include transceiver circuitry for transmitting and/or receiving signals in a network, such as network 110, via antennas 310. Antennas 310 may include one or more directional and/or omni-directional antennas.

Communication interface 315 may include any transceiver-like device that enables wireless station 115 to communicate with other devices and/or systems. For example, communication interface 315 may include a radio interface, an optical interface, an Ethernet interface, a coaxial interface, or some other type of interface for wired or wireless communication. Communication interface 315 may include a group of communication interfaces to handle multiple traffic flows.

As described herein, wireless station 115 may perform certain operations in response to processing system 300 executing software instructions contained in a computer-readable medium. The software instructions may be read into a memory of processing system 300 from another computer-readable medium or from another device via communication interface 315. The software instructions contained in the memory may cause processing system 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of wireless station 115, in other implementations, wireless station 115 may contain fewer components, different components, differently arranged components, or additional components than depicted in FIG. 3. Alternatively, or additionally, one or more components of wireless station 115 may perform one or more other tasks described as being performed by one or more other components of wireless station 115.

Example Functional Components

Figure 4:
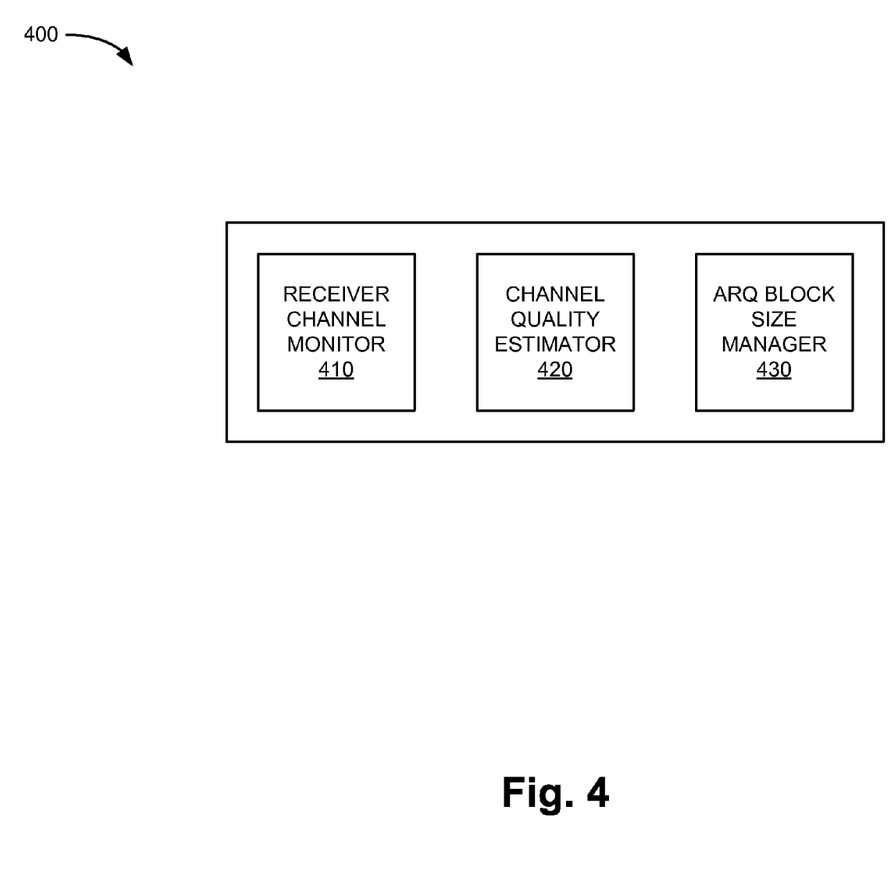
FIG. 4 is a block diagram of functional components of a device that may correspond to the terminal or the wireless station of FIG. 1.

FIG. 4 provides a block diagram of functional components of a device 400 that may correspond to terminal 105 or wireless station 115. As shown in FIG. 4, functional components of device 400 may include a receiver channel monitor 410, a channel quality estimator 420, and an ARQ block size manager 430. Device 400 may act as a transmitter device or a receiver device within a wireless communications channel. Thus, the functions described in FIG. 4 may be performed by one or more of the example components of terminal 105 and/or wireless station 115 depicted in FIG. 2 and FIG. 3, respectively.

Receiver channel monitor 410 may include hardware or a combination of hardware and software to monitor and provide feedback of channel quality to a transmitter device. For example, receiver channel monitor 410 may apply a CRC protocol, bit error rate (BER) monitoring, PER monitoring, SNR monitoring, etc. In one implementation, receiver channel monitor 410 may provide channel quality feedback metrics that are received by channel quality estimator 420 in a transmitter. The channel quality feedback metrics may include values (e.g., BER values, PER values, SNR values, etc.) calculated by the receiver or data that may be used by the transmitter to calculate the values.

Channel quality estimator 420 may include hardware or a combination of hardware and software to determine quality metrics of a wireless communications channel between a receiver and a transmitter. For example, channel quality estimator 420 may receive data from receiver channel monitor 410 that includes, or enables channel quality estimator 420 to determine, PER values and SNR values. In some implementations, channel quality estimator 420 may use data from both a receiver and a transmitter to estimate a particular channel quality metric. For example, a PER value may be calculated based on BER data. Channel quality estimator 420 may provide the channel quality metrics to ARQ block size manager 430.

ARQ block size manager 430 may include hardware or a combination of hardware and software to adaptively change the PDU size for a wireless communications channel under low SNR conditions. For example, ARQ block size manager 430 may compare channel quality metrics received from channel quality estimator 420 with a target PER value. ARQ block size manager 430 may determine if the PER is acceptable based on input from channel quality estimator 420 and/or comparisons with the target PER value. The target PER value may be based on, for example, particular quality-of-service (QoS) requirements associated with a transmitter and/or a receiver. ARQ block size manager 430 may incrementally reduce/increase the ARQ block size to identify an optimal PDU size (e.g., a maximum PDU size that achieves the target PER at the receiver). Changing the ARQ block size may effectively alter the minimum PDU size available to the transmitter.

In one implementation, ARQ block size manager 430 may converge upon an optimal PDU size using a binary search technique. Assume, for example, that a current PDU size is X (e.g., X bytes) and that the PER is greater than the target PER. The transmitter can next try sending an X/2 PDU size. If the current PER is then better than the target PER, the transmitter can then try with 3X/4. If the current PER is not better than the target PER, the transmitter can then try X/4, and so on. The transmitter may transmit with the same PDU size for a certain number of frames, K, to average out intermittent errors. Assuming the time difference between packet transmission and feedback reception is T, convergence can be expected in KT*log(X), where log is in base 2. However, if the current PDU size (e.g., the X value) becomes less than or equal to a minimum size (e.g., less than or equal to {PDU header size}+1), the transmitter may send a resynchronize message to the receiver.

In another implementation, ARQ block size manager 430 may compare channel quality metrics received from channel quality estimator 420 with a threshold SNR value. If a particular SNR value is detected, ARQ block size manager 430 may immediately return to use of an initial PDU size (e.g., the original PDU size determined from negotiations between the transmitter and receiver when the wireless connection was established) when an indication of an improved SNR is received. Thus, device 400 may not wait for an improved PER calculation or convergence mechanism to return to the initial PDU when a stronger SNR is indicated.

Although FIG. 4 shows example functional components of device 400, in other implementations, device 400 may contain fewer functional components, different functional components, differently arranged functional components, or additional functional components than depicted in FIG. 4. Alternatively, or additionally, one or more functional components of device 400 may perform one or more other tasks described as being performed by one or more other functional components of device 400.

Packet Fragmentation

Figure 5:
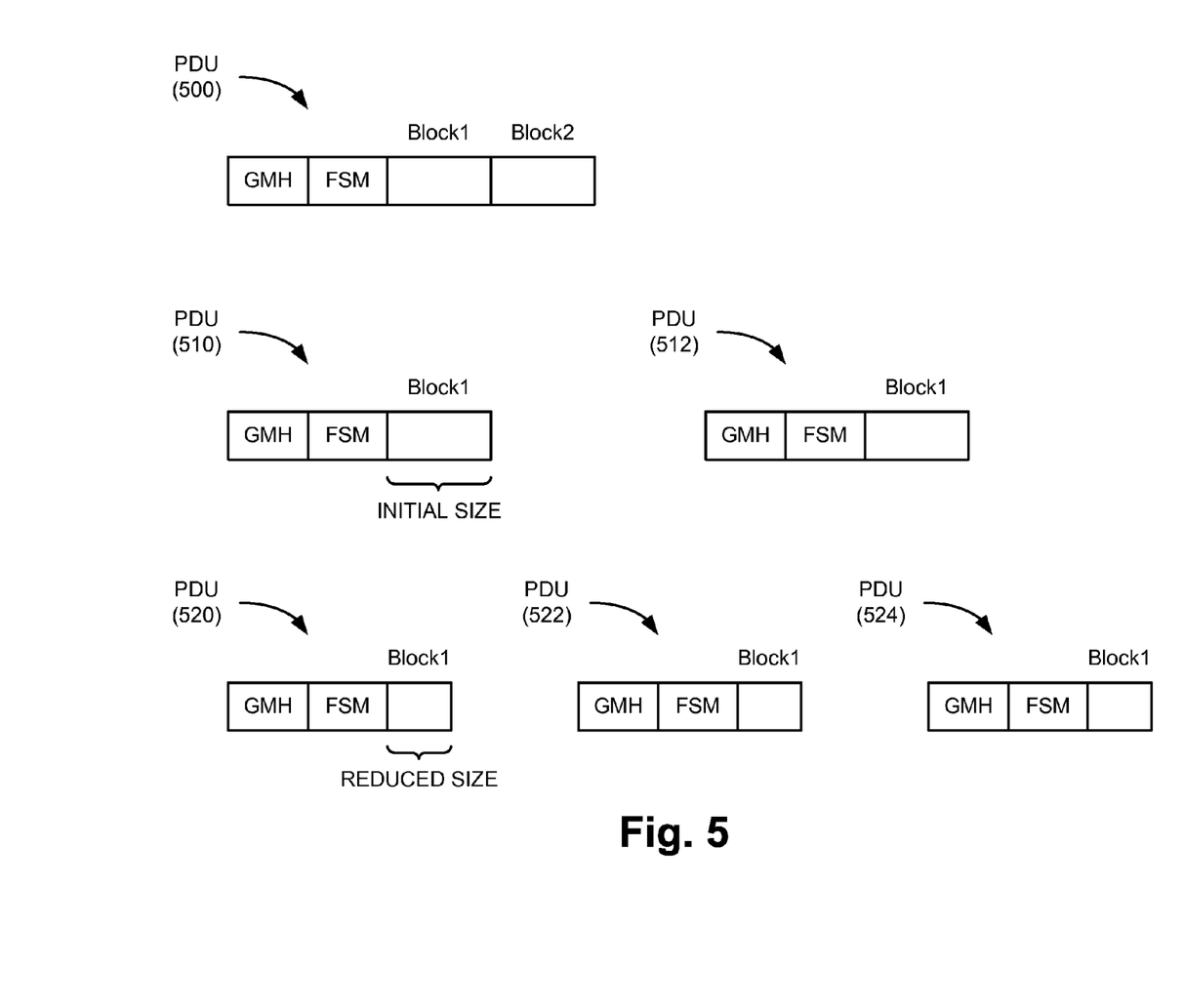
FIG. 5 provides block diagram of fragmentation that may occur under low SNR conditions according to an implementation described herein.

FIG. 5 provides block diagram of fragmentation that may occur under low SNR conditions according to an implementation herein. If ARQ is enabled for a connection, an extended fragmentation subheader (FSH), or an extended packing subheader (PSH, not shown) may be used, either of which is indicated by an extended bit in a general MAC header (GMH). Regardless of the subheader type (FSH or PSH), a block sequence number (BSN) may be included in the subheader that indicates a first ARQ block number in a PDU. A PDU may incorporate a number of ARQ blocks (e.g., Block1 and Block2 of PDU 500), each of which is of the same constant size except for the final block which may be smaller. Initially, the ARQ block size may be an ARQ connection parameter negotiated between the transmitter device (e.g., terminal 105) and the receiver (e.g., wireless station 115) upon a connection setup. The remaining block numbers in a PDU can be derived based on the ARQ block size, the overall PDU size, and the first block number. Thus, the ARQ block size may be a constant parameter. If there is a sufficiently small ARQ block size, then the transmitter may construct a smaller PDU. For example, when SNR conditions deteriorate, ARQ mechanisms may fragment PDU 500 to form multiple PDUs 510 and 512.

However, in implementations described herein, when a target PER cannot be achieved with ARQ fragmentation at a constant block size (and other know techniques for addressing low SNR conditions have been applied), the ARQ block size may be modified to increase throughput under these low SNR conditions. As shown in FIG. 5, for example, the block size of the ARQ block (Block1) of PDUs 510 and 512 may be reduced to form multiple PDUs 520, 522, and 524 with reduced ARQ block sizes. Reduction of the ARQ block size (Block1) in PDUs 520, 522 and 524 may result in a smaller PDU, since the header sizes of the PDU may be considered constant. Once the target PER is achieved by implementing the smaller ARQ block size, the transmitter may continue to monitor PER values to increase/decrease the ARQ block size to an optimal level until improved SNR conditions return.

Example Process

Figure 6:
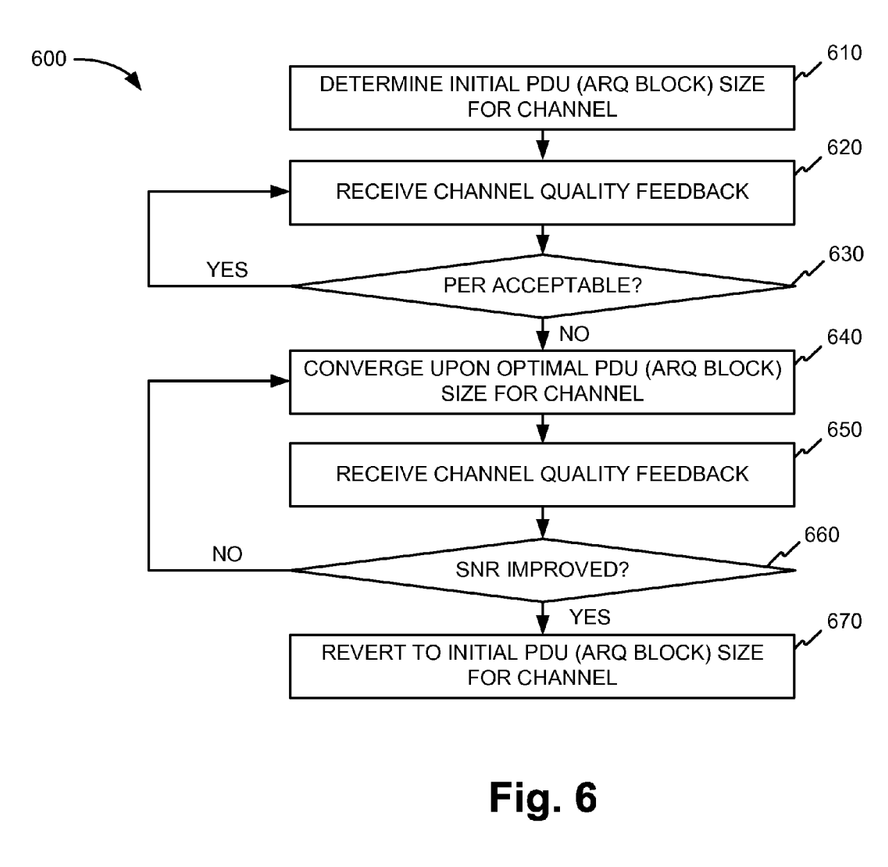
FIGS. 6 and 7 are flow diagrams for increasing throughput by adaptively changing PDU size in a wireless network under low SNR conditions according to an implementation described herein.
Figure 7:
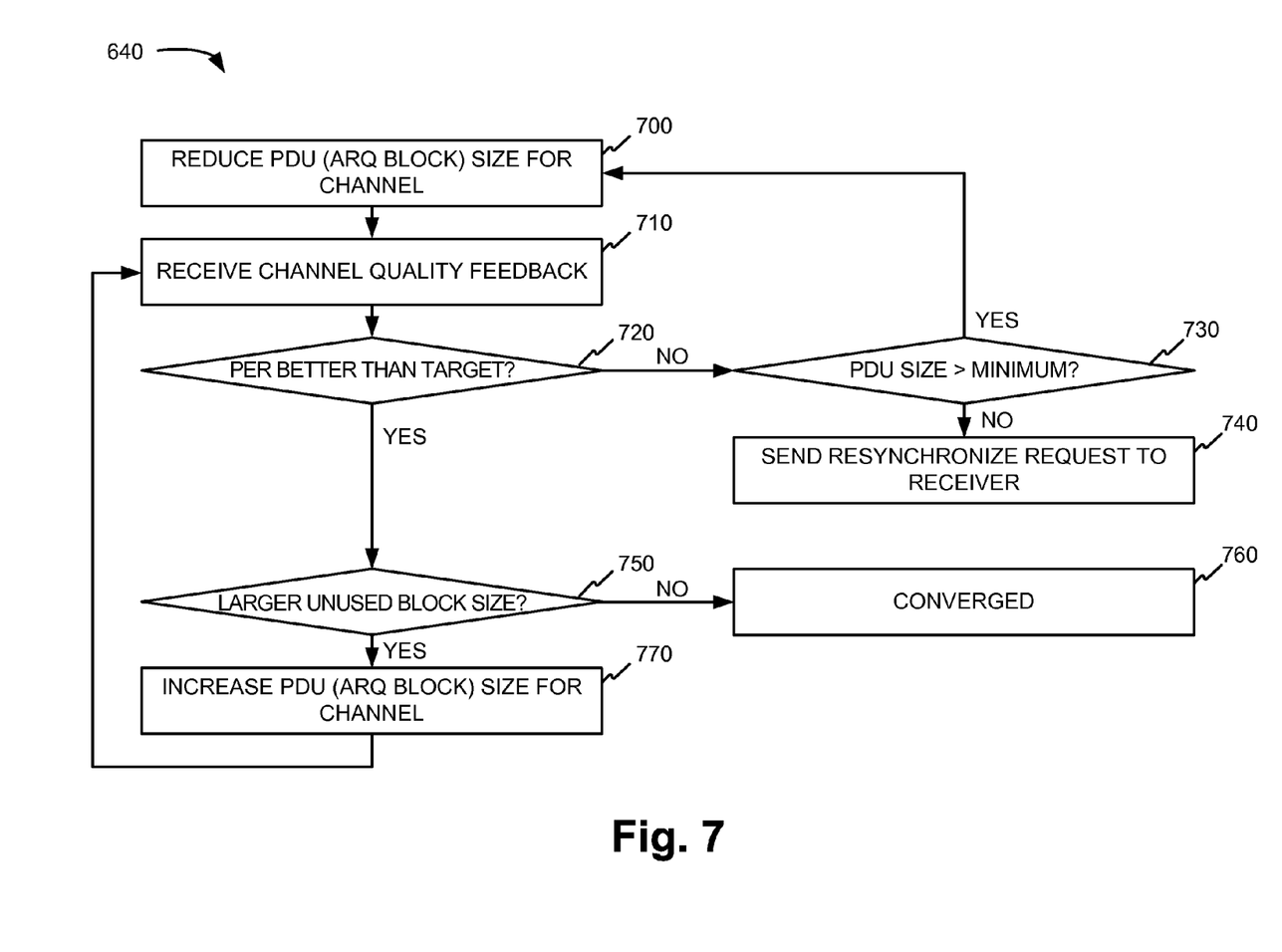

FIGS. 6 and 7 are flow charts of a process 600 for increasing throughput by adaptively changing PDU size in wireless networks under low SNR conditions according to implementations described herein. In one implementation, process 600 may be performed by terminal 105 and/or wireless station 115. In another implementation, some or all of process 600 may be performed by one or more other devices in conjunction with terminal 105 and/or wireless station 115.

As illustrated in FIG. 6, process 600 may include determining an initial PDU size for a channel (block 610). For example, the initial PDU size may be established by negotiation during the connection creation and connection change dialogs between transmitting device 400 (e.g., terminal 105-1) and the receiving device 400 (e.g., wireless station 115). The transmitting device 400 may provide a desired setting in a REQ message to the receiving device 400. The receiving device 400 may take the smaller of the value the receiving device 400 prefers and the value in the REQ message. This minimum value may be included in a RSP message from the receiving device 400 to the transmitting device 400 and may become the agreed upon PDU size.

Channel quality feedback may be received (block 620). For example, receiver channel monitor 410 (e.g., of receiving device 400) may provide channel quality feedback metrics that are received by channel quality estimator 420 (e.g., of transmitting device 400). Channel quality feedback metrics may include, for example, BER values, PER values, SNR values, etc. that may be calculated by the receiver or calculated by the transmitter based on values from the receiver.

It may be determined if the PER is acceptable (block 630). For example, ARQ block size manager 430 may determine if the PER is acceptable based on input from channel quality estimator 420 and/or comparisons with a threshold PER value. The threshold PER value may be based on, for example, particular quality-of-service (QoS) requirements associated with a transmitter and/or a receiver. If the PER is acceptable (block 630-YES), process 600 may return to block 620 to continue to monitor the channel quality feedback.

If the PER is not acceptable (block 630-NO), an optimal PDU (ARQ block) size, for the channel, may be converged upon (block 640). For example, ARQ block size manager 430 may incrementally reduce/increase the ARQ block size to identify an optimal PDU size. Changing the ARQ block size may effectively alter the minimum PDU size available to the transmitter. In one implementation, ARQ block size manager 430 may converge upon an optimal PDU size (e.g., a maximum size that results in the target PER at the receiver) using a binary search technique.

Channel quality feedback may be received (block 650) and it may be determined if the SNR, for the channel, improves (block 660). For example, receiver channel monitor 410 (e.g., of receiving device 400) may provide channel quality feedback metrics that are received by channel quality estimator 420 (e.g., of transmitting device 400). Particularly, channel quality feedback metrics may be monitored to determine if the SNR value has increased to levels that may allow for use of the initial PDU size (e.g., determined in block 600). ARQ block size manager 430 may also continue to monitor PER values against the target PER. If the SNR has not improved (block 660-NO), process 600 may return to block 640 to converge/maintain an optimal PDU size for the channel.

If the SNR has improved (block 660-YES), the channel may revert to the initial PDU (ARQ block) size (block 670). For example, ARQ block size manager 430 may immediately return to use of the initial PDU size (e.g., determined in block 600) when an indication of an improved SNR is received. Thus, transmitting device 400 may not wait for an improved PER calculation or convergence mechanism to return to the initial PDU when a stronger SNR is indicated.

Process block 640 may include the process blocks depicted in FIG. 7. As shown in FIG. 7, process block 640 may include reducing the PDU (ARQ block) size for the channel (block 700), receiving channel quality feedback (block 710), and determining if the actual PER is better than a target PER (block 720). In one implementation, ARQ block size manager 430 (e.g., of transmitting device 400) may apply a binary search technique to converge on the PDU size that results in the target PER at the receiver end (e.g., receiving device 400). For example, assume the current PDU size is represented by "X," and the current PER is greater than the target PER. Transmitting device 400 may reduce the PDU size to X/2. Transmitting device 400 may send data using the X/2 PDU size, and may receive feedback from receiving device 400, for a particular number of frames, K. The value of K may be a sufficient value selected to average out intermittent transmission errors. Based on feedback from receiving device 400 for the K frames, transmitting device 400 may determine if the reduced (i.e., X/2) PDU size provides an actual PER value within the target PER.

Returning to FIG. 7, if the actual PER is not better than the target PER (block 720—NO), it may be determined if the current PDU (ARQ block) size can be reduced further (block 730). For example, ARQ block size manager 430 may determine if the PDU value can be reduced above a minimum value (e.g., a size that can still transfer relevant data). In one implementation, transmitting device 400 may determine if the current PDU size is greater than the minimum size of one byte plus the PDU header size. If the current PDU (ARQ block) size is greater than the minimum PDU header size (block 730-YES), process block 640 may return to block 700 to further reduce the PDU (ARQ block) size for the channel. For example, transmitting device 400 may reduce the PDU size to the next binary increment (e.g., X/4).

If the current PDU (ARQ block) size is not greater than the minimum PDU header size (block 750-NO), a resynchronize request may be sent to the receiver (block 740). For example, if transmitting device 400 determines that no smaller PDU size increment is available, transmitting device 400 may send a resynchronize message to receiver 400 to reconfigure the connection.

Returning to FIG. 7, if the actual PER is better than the target PER (block 720-YES), it may be determined if there is a larger unused PDU (ARQ block) size (block 750) available. For example, ARQ block manager 430 may determine if a larger binary increment is available to test. If there is not a larger unused PDU (ARQ block) size (block 750-NO), it may be deemed to have converged on the optimal PDU (ARQ block) size (block 760). If there is a larger unused PDU (ARQ block) size (block 750-YES), the PDU (ARQ block) size for the channel may be increased (block 770). For example, transmitting device 400 may increase the PDU size to 3X/4. Transmitting device 400 may send data using the 3X/4 PDU size for K frames. Process block 770 may then return to block 710 to receive channel quality feedback and make further PDU size adjustments to converge upon an optimal PDU size. Assuming, for a binary search, that the time difference between a data transmission from the transmitter and feedback reception at the transmitter is T, convergence can be expected in KT.log(X), where log is base 2.

CONCLUSION

Implementations described herein may include systems and/or methods that receive feedback that indicates low SNR conditions for a wireless communications link between a transmitter device and a receiver device. After attempts to improve PER by increasing transmission power for the wireless communications link, the systems and/or methods may receive feedback that indicates a current PER, for data transmitted using an initial ARQ block size, is above a target PER for the receiver device, and change, based on the feedback that indicates the current PER, the current ARQ block size to a different ARQ block size for the wireless communications link. The different ARQ block size may be adaptively selected to provide a maximum PDU size that achieves the target PER at the receiver device under the low SNR conditions.

The systems and/or methods described herein may provide an additional measure to maintain a target PER under low SNR conditions after the other measures (e.g., increasing transmitter power) have been used. Thus, implementations herein may further decrease the SNR under which a wireless receiver can operate.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method comprising:
  receiving, by a transmitter device, first feedback,
    the first feedback indicating:
      that a current packet error rate (PER), for a wireless communications link between the transmitter device and a receiver device, is greater than a target PER for the wireless communications link;
  reducing, by the transmitter device, a current automatic repeat request (ARQ) block size from a first ARQ block size to a second ARQ block size based on the current PER being greater than the target PER for the wireless communications link;
  transmitting, from the transmitter device and to the receiver device, data over the wireless communications link using the second ARQ block size;
  receiving, by the transmitter device, second feedback,
    the second feedback indicating that a PER for the data transmitted using the second ARQ block size is less than the target PER for the wireless communications link;
  increasing, by the transmitter device, the current ARQ block size from the second ARQ block size to a third ARQ block size based on the PER for the data transmit- ted using the second ARQ block size being less than the target PER for the wireless communications link,
the third ARQ block size being less than the first ARQ block size and greater than the second ARQ block size; and
transmitting, from the transmitter device and to the receiver device, data over the wireless communication link using the third ARQ block size.

2. The method of claim 1, further comprising:
determining a signal-to-noise ratio (SNR) for the wireless communications link;
increasing a power level of the transmitter device based on the SNR for the wireless communications link;
transmitting, from the transmitter device and to the receiver device, data over the wireless communications link using the increased power level; and
where receiving the first feedback includes:
receiving the first feedback based on transmitting the data over the wireless communications link using the increased power level.

3. The method of claim 1, further comprising:
determining a signal-to-noise ratio (SNR) for the wireless communications link;
transmitting, from the transmitter device and to the receiver device, data over the wireless communications link using ARQ fragmentation at a constant block size based on the SNR for the wireless communications link; and
where receiving the first feedback includes:
receiving the first feedback based on transmitting the data over the wireless communications link using the ARQ fragmentation at the constant block size.

4. The method of claim 1, where reducing the current ARQ block size from the first ARQ block size to the second ARQ block size includes:
determining the second ARQ block size using a binary search technique.

5. The method of claim 1, where increasing the second ARQ block size to the third ARQ block size includes:
determining, for the wireless communications link, a maximum protocol data unit (PDU) size that results in the target PER at the receiver device, and
determining the third ARQ block size based on the determined maximum PDU size.

6. The method of claim 1, further comprising:
receiving third feedback,
the third feedback indicating that a PER for the data transmitted using the third ARQ block size is greater than the target PER for the wireless communications link;
reducing the current ARQ block size from the third ARQ block size to a fourth ARQ block size based on the PER for the data transmitted using the third ARQ block size being greater than the target PER for the wireless communications link,
the fourth ARQ block size being less than the third ARQ block size and greater than the second ARQ block size; and
transmitting, from the transmitter device and to the receiver device, data over the wireless communication link using the fourth ARQ block size.

7. The method of claim 1, further comprising:
determining that the current ARQ block size comprises a minimum ARQ block size for the wireless communications link; and
transmitting a resynchronize message to the receiver device based on the current ARQ block size comprising the minimum ARQ block size for the wireless communications link.

8. A device comprising:
a processor to:
receive first feedback,
the first feedback indicating:
that a current packet error rate (PER), for a wireless communications link between the device and another device, is greater than a target PER for the wireless communications link,
reduce a current automatic repeat request (ARQ) block size from a first ARQ block size to a second ARQ block size based on the current PER being greater than the target PER for the wireless communications link,
send, to the other device, data over the wireless communications link using the second ARQ block size,
receive second feedback,
the second feedback indicating that a PER for the data sent using the second ARQ block size is less than the target PER for the wireless communications link,
increase the current ARQ block size from the second ARQ block size to a third ARQ block size based on the PER for the data sent using the second ARQ block size being less than the target PER for the wireless communications link,
the third ARQ block size being less than the first ARQ block size and greater than the second ARQ block size, and
send, to the other device, data over the wireless communication link using the third ARQ block size.

9. The device of claim 8, where the processor is further to:
determine a signal-to-noise ratio (SNR) for the wireless communications link,
increase a power level of the device based on the SNR for the wireless communications link,
send, to the other device, data over the wireless communications link using the increased power level, and
where, when receiving the first feedback, the processor is to:
receive the first feedback based on sending the data over the wireless communications link using the increased power level.

10. The device of claim 8, where the processor is further to:
determine a signal-to-noise ratio (SNR) for the wireless communications link,
send, to the other device, data over the wireless communications link using ARQ fragmentation at a constant block size based on the SNR for the wireless communications link, and
where, when receiving the first feedback, the processor is to:
receive the first feedback based on sending the data over the wireless communications link using the ARQ fragmentation at the constant block size.

11. The device of claim 8, where, when reducing the current ARQ block size from the first ARQ block size to the second ARQ block size, the processor is to:
determine the second ARQ block size using a binary search technique.

12. The device of claim 8, where, when increasing the second ARQ block size to the third ARQ block size, the processor is to:

determine, for the wireless communications link, a maximum protocol data unit (PDU) size that results in the target PER at the other device, and determine the third ARQ block size based on the determined maximum PDU size.

13. The device of claim 8, where the processor is further to:

receive third feedback,
the third feedback indicating that a PER for the data sent using the third ARQ block size is greater than the target PER for the wireless communications link, reduce the current ARQ block size from the third ARQ block size to a fourth ARQ block size based on the PER for the data sent using the third ARQ block size being greater than the target PER for the wireless communications link,
the fourth ARQ block size being less than the third ARQ block size and greater than the second ARQ block size, and send, to the other device, data over the wireless communication link using the fourth ARQ block size.

14. The device of claim 8, where the processor is further to:

determine that the current ARQ block size comprises a minimum ARQ block size for the wireless communications link, and send a resynchronize message to the other device based on the current ARQ block size comprising the minimum ARQ block size for the wireless communications link.

15. A computer-readable medium storing instructions, the instructions comprising:

one or more instructions that, when executed by a processor, cause the processor to:
receive first feedback,
the first feedback indicating that a current packet error rate (PER), for a wireless communications link between the device and another device, is greater than a target PER for the wireless communications link,
reduce a current automatic repeat request (ARQ) block size from a first ARQ block size to a second ARQ block size based on the current PER being greater than the target PER for the wireless communications link,
send, to the other device, data over the wireless communications link using the second ARQ block size,
receive second feedback,
the second feedback indicating that a PER for the data sent using the second ARQ block size is less than the target PER for the wireless communications link,
increase the current ARQ block size from the second ARQ block size to a third ARQ block size based on the PER for the data sent using the second ARQ block size being less than the target PER for the wireless communications link,
the third ARQ block size being less than the first ARQ block size and greater than the second ARQ block size, and
send, to the other device, data over the wireless communication link using the third ARQ block size.

16. The computer-readable medium of claim 15, where the instructions further comprise:

one or more instructions to:
determine a signal-to-noise ratio (SNR) for the wireless communications link,
increase a power level of the device based on the low SNR for the wireless communications link,
send, to the other device, data over the wireless communications link using the increased power level, and
where the one or more instructions to receive the first feedback include:
one or more instructions to receive the first feedback based on sending the data over the wireless communications link using the increased power level.

17. The computer-readable medium of claim 15, where the instructions further comprise:

one or more instructions to:
determine a signal-to-noise ratio (SNR) for the wireless communications link,
send, to the other device, data over the wireless communications link using ARQ fragmentation at a constant block size based on the SNR for the wireless communications link, and
where the one or more instructions to receive the first feedback include:
one or more instructions to receive the first feedback based on sending the data over the wireless communications link using the ARQ fragmentation at the constant block size.

18. The computer-readable medium of claim 15, where the one or more instructions to increase the second ARQ block size to the third ARQ block size include:

one or more instructions to:
determine, for the wireless communications link, a maximum protocol data unit (PDU) size that results in the target PER at the other device, and
determine the third ARQ block size based on the determined maximum PDU size.

19. The computer-readable medium of claim 15, where the instructions further comprise:

one or more instructions to:
receive third feedback,
the third feedback indicating that a PER for the data sent using the third ARQ block size is greater than the target PER for the wireless communications link,
reduce the current ARQ block size from the third ARQ block size to a fourth ARQ block size based on the PER for the data sent using the third ARQ block size being greater than the target PER for the wireless communications link,
the fourth ARQ block size being less than the third ARQ block size and greater than the second ARQ block size, and
send, to the other device, data over the wireless communication link using the fourth ARQ block size.

20. The computer-readable medium of claim 15, where the instructions further comprise:

one or more instructions to:
determine that the current ARQ block size comprises a minimum ARQ block size for the wireless communications link, and
send a resynchronize message to the other device based on the current ARQ block size comprising the minimum ARQ block size for the wireless communications link.

* * * * *